US010250531B2

(12) United States Patent
Ray

(10) Patent No.: US 10,250,531 B2
(45) Date of Patent: Apr. 2, 2019

(54) BOT MONITORING

(71) Applicant: Microsoft Technology Licensing, LLC., Redmond, WA (US)

(72) Inventor: Mayukh Ray, Vancouver (CA)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 155 days.

(21) Appl. No.: 15/287,683

(22) Filed: Oct. 6, 2016

(65) Prior Publication Data

US 2018/0102988 A1  Apr. 12, 2018

(51) Int. Cl.
*H04L 12/26* (2006.01)
*H04L 12/58* (2006.01)
*H04L 29/08* (2006.01)

(52) U.S. Cl.
CPC .............. *H04L 51/02* (2013.01); *H04L 43/06* (2013.01); *H04L 43/0817* (2013.01); *H04L 67/025* (2013.01); *H04L 51/18* (2013.01)

(58) Field of Classification Search
USPC .................................. 709/206, 200, 224, 219
See application file for complete search history.

(56) References Cited

U.S. PATENT DOCUMENTS

| | | | |
|---|---|---|---|
| 7,580,710 B2 | 8/2009 | Katz et al. | |
| 8,386,854 B2 | 2/2013 | Fernandess et al. | |
| 8,452,761 B2 | 5/2013 | Sabato et al. | |
| 8,682,812 B1 | 3/2014 | Ranjan | |
| 9,183,529 B2 | 11/2015 | Gluzman Peregrine et al. | |
| 9,318,108 B2 | 4/2016 | Gruber et al. | |
| 2014/0365828 A1 | 12/2014 | Jiang et al. | |
| 2015/0106665 A1* | 4/2015 | Choh | H04L 51/08 714/57 |
| 2015/0326588 A1 | 11/2015 | Vissamsetty et al. | |
| 2016/0142344 A1* | 5/2016 | Mandhani | H04L 51/02 709/206 |
| 2017/0142129 A1* | 5/2017 | Peng | H04L 47/72 |

FOREIGN PATENT DOCUMENTS

| | | |
|---|---|---|
| CN | 103166785 A | 6/2013 |
| CN | 103399887 A | 11/2013 |

OTHER PUBLICATIONS

"ChatterBot", Published on: Jan. 21, 2016 Available at: https://www.spigotmc.org/resources/chatterbot.890/.
"Processing Logs at Scale Using Cloud Dataflow", Published on: Jan. 21, 2016 Available at: https://cloud.google.com/solutions/processing-logs-at-scale-using-dataflow.
(Continued)

*Primary Examiner* — El Hadji M Sall
(74) *Attorney, Agent, or Firm* — Merchant & Gould

(57) ABSTRACT

Monitoring a computer system or framework via a bot integrated into a messaging application is provided herein. A bot is made available as a contact within a messaging application to receive queries on a computer system/framework via messages from users. The bot is communicated with one or more systems or machines in a monitored computing system/framework to execute those queries and return a response to the user via the messaging application or another selected application.

18 Claims, 10 Drawing Sheets

(56) References Cited

OTHER PUBLICATIONS

Morton et al., "KAMD: A Progress Estimator for MapReduce Pipelines", In Proceedings of 26th IEEE International Conference on Data Engineering, Mar. 1, 2010, 9 pages.

Casaletto, James, "Managing, Monitoring, and Testing MapReduce Jobs: Managing Jobs and Tasks", Published on: Feb. 10, 2015 Available at: https://www.mapr.com/blog/managing-monitoring-and-testing-mapreduce-jobs-managing-jobs-and-tasks.

Al-Hammadi et al., "Detecting Bots Based on Keylogging Activities", In Journal of Computing Research Repository, Feb. 2010, pp. 1-7.

Skowronski, Jason, "Using Loggly to Monitor Your Logs for Performance Problems", Published on: Oct. 24, 2014 Available at: https://www.loggly.com/blog/using-loggly-monitor-logs-performance-problems/.

* cited by examiner

BOT MONITORING

BACKGROUND

Administrators of various systems use various logs and telemetry data to monitor those systems. These logs and telemetry data are often accessible via special programs on the machines that collect the data stored in the logs, which can require the administrator to physically access those machines locally or remotely, such as, for example, via a secure shell or remote desktop application to access those logs and affect the system being logged. Accessing the machines locally or via a remote access program is time consuming, cumbersome, and requires computing resources to be expended above and beyond the collection and reading of these logs and telemetry data.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

Systems, methods, and computer-readable storage devices including instructions for the provision of bot monitoring are provided herein. The bot is integrated with a messaging application and allows a user to use an existing communications channel to receive reports on the monitored computing system/framework's status without needing to directly connect with machines hosted in the monitored computing system/framework. These reports are received in the messaging application or a designated secondary application (e.g., the request for a report is transmitted via an instant messenger application and received via an email application).

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
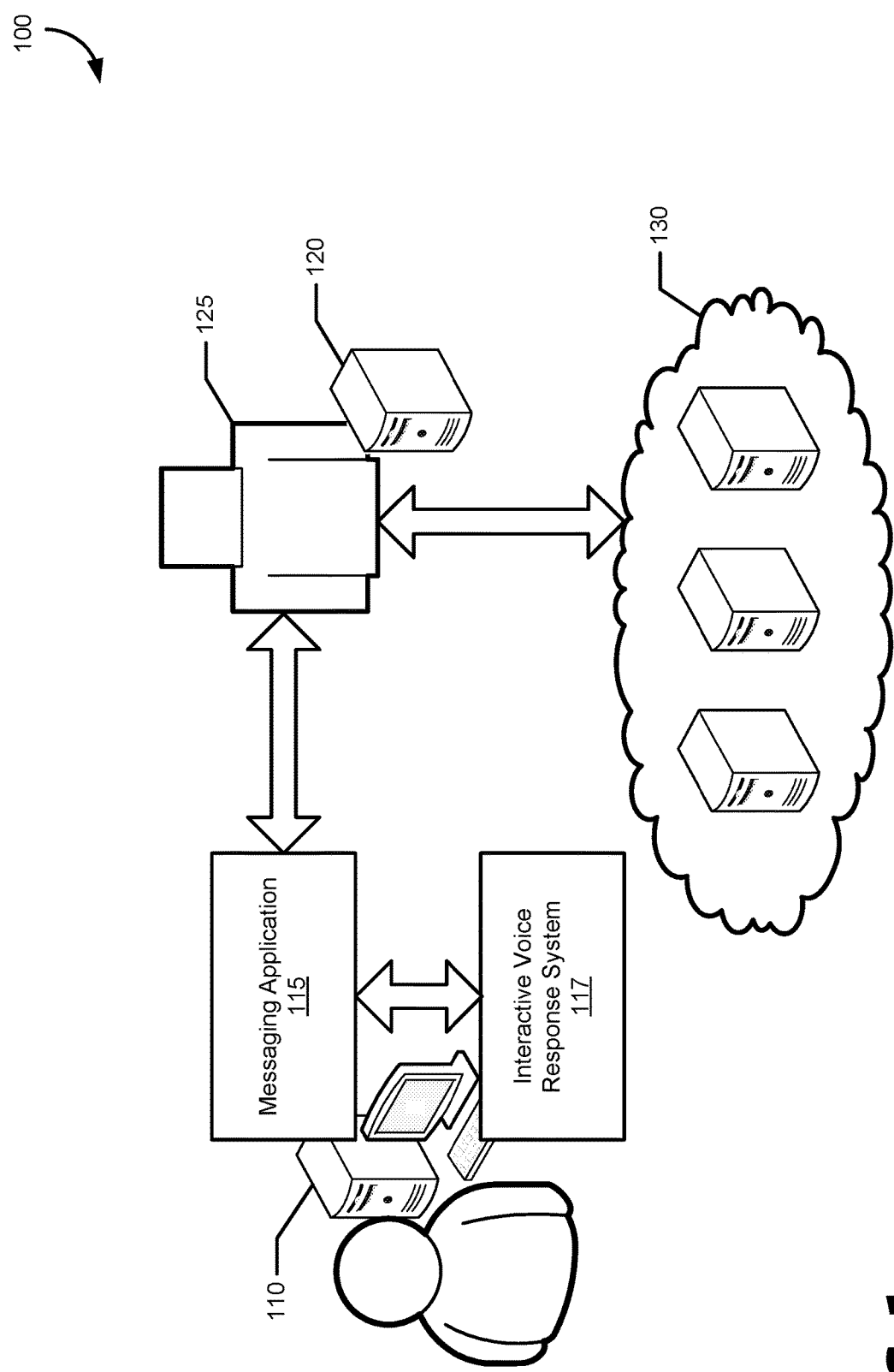
FIG. 1 illustrates an example environment in which bot monitoring is practiced.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Systems, methods, and computer-readable storage devices including instructions for the provision of bot monitoring are provided herein. The bot is integrated with a messaging application and allows a user to use an existing communications channel to receive reports on the monitored computing system/framework's status without needing to directly connect with machines hosted in the monitored computing system/framework. These reports are received in the messaging application or a designated secondary application (e.g., the request for a report is transmitted via an instant messenger application and received via an email application). The bot gains permissions equal to those of the user to provide authorized users with an improved user experience when monitoring a network or other system. The bot extends the functionality of the user's device and the messaging client by enabling a user to submit queries (and receive responses to those queries) via the messaging application.

FIG. 1 illustrates an example environment 100 in which bot monitoring is practiced. As illustrated, a user device 110 is running a messaging application 115 to communicate with a monitoring bot 125 hosted on a cloud hosted messaging service 120. The monitoring bot 125 enables the user to monitor a monitored computing system/framework 130 (which may be any system or framework designated by a user to monitor), including one or more machines or services that are queried by the monitoring bot 125 on behalf of the user. The responses from the monitored computing system/framework 130 are handled by the monitoring bot 125 and are returned to the user device 110 for the messaging application 115 or to another designated application to display to the user.

In various aspects, the user device 110, cloud hosted messaging service 120, and monitored computing system/framework 130 are part of different domains or network environments, or may share one or more domains or network environments. In one example, the user device 110, the cloud hosted messaging service 120, and the monitored computing system/framework 130 are part of the same network environment, such as an administrator terminal checking on an enterprise network via an internally managed messenger client. In another example, a user logs into a publically hosted cloud hosted messaging service 120 via the user device 110 to check the status of a monitored computing system/framework 130 remote to both the user device 110 and to the cloud hosted messaging service 120. The cloud hosted messaging service 120 is operable to log the user into its hosted messaging client via an access token generated at the time of logon to the user device 110, and to use that access token to provide the monitoring bot 125 with access to the monitored computing system/framework 130 equal to that of the user.

A user logged into the environment of a messaging application 115 will see various contacts who are logged in and available, logged in and unavailable (e.g., "in a meeting", "busy", "do not disturb"), or who are not logged in (and therefore, unavailable). The monitoring bot 125 is presented as one such contact, but in various aspects may be displayed as "busy" or "unavailable" when the monitored computing system/framework 130 is offline, not specified, or the user does not have permissions to access the monitored computing system/framework 130.

The user device 110, cloud hosted messaging service 120, and monitored computing system/framework 130 are illustrative of a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers. The hardware of these computing systems is discussed in greater detail in regard to FIGS. 5, 6A, 6B, and 7. In various aspects, the computing devices are accessed locally and/or by a network, which may include the Internet, a Local Area Network (LAN), a private distributed network for an entity (e.g., a company, a university, a government agency), a wireless ad hoc network, a Virtual Private Network (VPN) or other direct data link (e.g., Bluetooth connection, a direct wired link).

The user device 110 runs the messaging application 115, which communicates with a cloud hosted messaging service 120 to send messages to another user via the messaging application 115. Various intermediaries (e.g., networks and servers) may be interposed between the user device 110 running the messaging application 115 and the message recipient that facilitate the routing of the messages. Additionally, the cloud hosted messaging service 120 communicates status updates to the messaging application 115, including status updates for each of the contacts within the messaging application 115, one such contact being the monitoring bot 125.

In various aspects, the user device 110 also runs an Interactive Voice Response (IVR) system 117 in communication with the messaging application 115. An IVR system 117 allows the user to send and receive messages via the messaging application 115 via audio signals, such as speech or dual-tone multi-frequency tones. In various aspects, the audio signals are used as distinct inputs, while in other aspects the audio signals are converted to text for the user to read and approve before transmission to the monitoring bot 125 or another contact (e.g., via a verbal or manual acceptance). The IVR system 117 is operable to receive commands and content from the user via a microphone or other sound producing device associated with the user device 110 and to output messages received by the messaging application 115 via speakers or other sound output devices associated with the user device 110.

The messaging application 115 is illustrative of any client associated with an application used to send and receive messages, including, without limitation, local applications and cloud-based applications, such as WhatsApp® Messenger (offered by WhatsApp, Inc. of Mountain View, Calif.), Facebook® Messenger (offered by Facebook, Inc. of Menlo Park, Calif.), Google Chat™ (offered by Alphabet, Inc. of Mountain View, Calif.), Yahoo!® Messenger (offered by Yahoo, Inc. of Sunnyvale, Calif.), and Skype® (offered by Skype Technologies S.A.R.L. of Luxembourg City, Luxembourg). In additional aspects, the messaging application 115 is integrated or in communication with a social media platform, such as, Facebook® (offered by Facebook, Inc.) or LinkedIn™ (offered by Microsoft, Corp.), a communication application suite, such as Skype® for Business (offered by Microsoft, Corp.), or other messaging environment.

The cloud hosted messaging service 120 includes one or more computing devices to provide functionality for communicating messages between messaging applications 115. The monitoring bot 125 extends the functionality of the user device 110 and the cloud hosted messaging service 120 by enabling a user to submit queries (and receive responses to those queries) via the messaging application 115.

The monitoring bot 125 is integrated into the messaging application 115 in some aspects as a "user" hosted by the cloud hosted messaging service 120 and in other aspects as a plugin locally on the user device 110. The monitoring bot 125 is operable to receive messages via the messaging application 115 and to identify queries included in the messages. Messages sent to the monitoring bot 125 by a user may be structured as natural language messages or as menu-driven messages. For example, a user transmits a message to the monitoring as a sentence, phrase, or set of keywords in a natural language message (e.g., "What is the health of the network?", "network health report") that the monitoring bot 125 parses based on grammatical structure and content to determine the command and object of the command included in the query. In another example, a user activates the monitoring bot 125 via the messaging application 115, which returns a menu interface including operands associated with options for commands and objects for the user to pick from. When the monitoring bot 125 receives a response after transmitting the menu interface, it will parse the subsequent message from the user for operands identifying an option from a presented menu (e.g., "1—For Network Health, 2—For Unique User Numbers, 3—For Error log Reports" to which the user responds with a message containing 1, 2, or 3 as operands).

When the monitoring bot 125 needs additional information to identify commands and objects thereof from the message, a clarification message is sent to the messaging application 115 for display to the user. In some aspects, a clarification message is transmitted in response to a message that has been correctly identified by the monitoring bot 125, but initiates a menu-driven communication. For example, a user first activates the monitoring bot 125 by sending a natural language message to which the monitoring bot 125 responds by providing a top-level of a menu interface. In another example, in response to receiving an operand identifying an option from a menu interface, the monitoring bot 125 responds by providing a sub-menu based on the operand received from the user. In a further example, when the monitoring bot 125 cannot map a natural language message or a menu-driven message from the user to a command and/or object, the monitoring bot 125 will provide a response asking the user to resubmit the message (e.g., "I am sorry, but I did not understand you. Please try again."). As will be appreciated, a messaging session between a user and the monitoring bot 125 may include several rounds of clarification messages and may switch back and forth between using natural language messages and menu-driven messages.

In response to parsing the message for a query and determining the command and at least one object, the monitoring bot 125 formats the query to run the query on a machine or service of the monitored computing system/framework 130 specified as the object. The queries are directed to an object maintained in the monitored computing system/framework 130, such as, for example, a network pipeline, a telemetry log, an error log, etc. In some aspects, more than one object is queried by a single command to produce an enhanced response. In one example, a query to a monitored computing system/framework 130 of a personal computing device may request a log of network commands to identify malicious programs by identifying suspicious network activities. In a second example, a query to a monitored computing system/framework 130 of an email server may request the telemetry data of one or more users. In a third example, a query to a monitored computing system/framework 130 of a cloud computing environment including multiple devices and tenants may request a log data to identify recent errors in the cloud computing environment.

The monitoring bot 125 receives the response from the monitored computing system/framework 130 and is operable to format the response for presentation via the messaging application 115 or to format the response for presentation via another application. For example, a user may request to receive the response as text in the messaging application 115, via email, as an image or datagraphic, as an additional line to a spreadsheet or comma separated value list, etc. In other aspects, the user may request that another user be contacted by the monitoring bot 125 with the response, for example, to share the results of the query.

Figure 2:
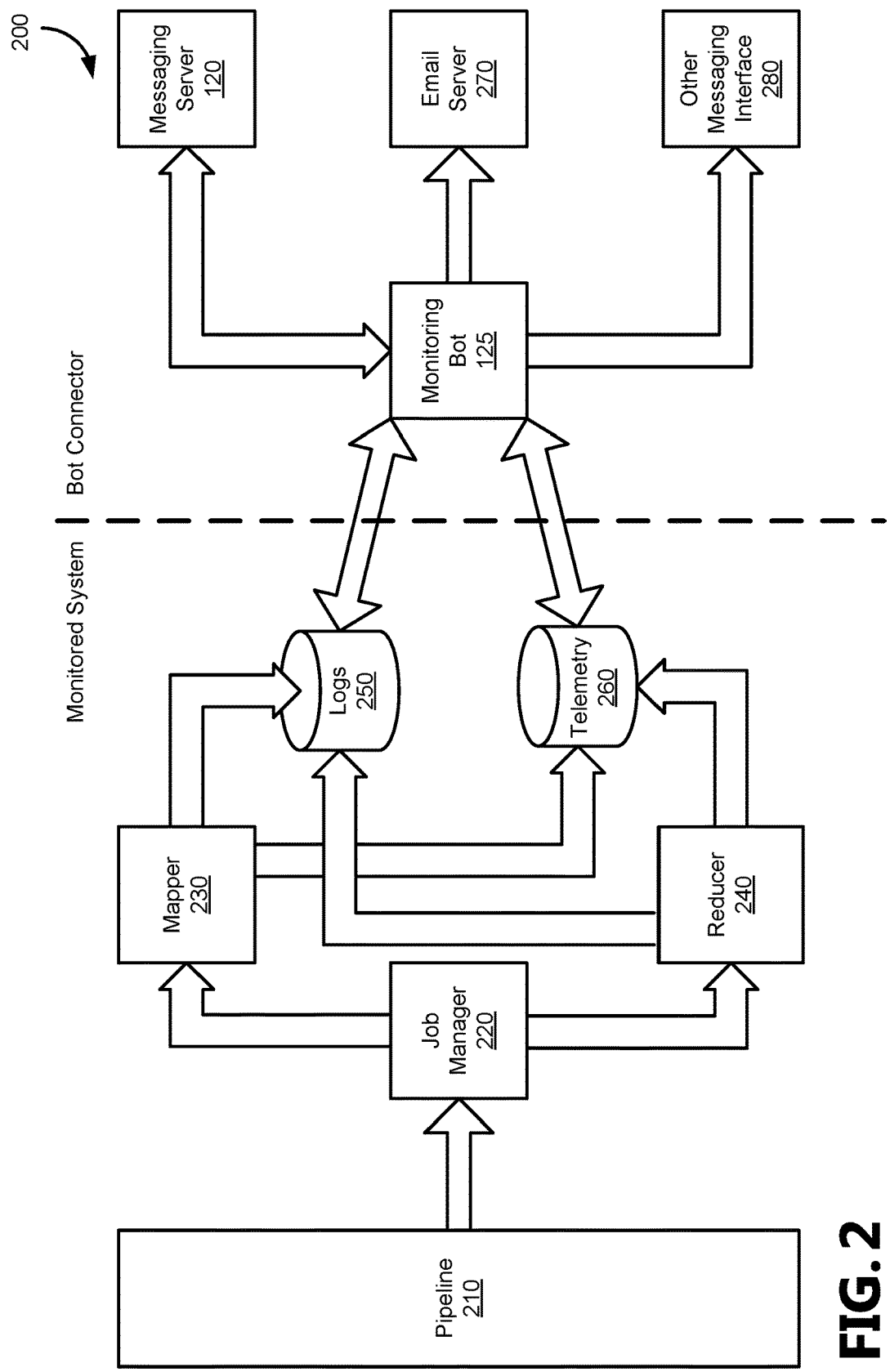
FIG. 2 illustrates an example connection layout between a monitored system and a bot.

FIG. 2 illustrates an example connection layout 200 between a monitored system and a bot. The illustrated connection layout 200 is divided into a monitored system portion, illustrating various example components of a system part of a monitored computing system/framework 130 in communication with the monitoring bot 125, and a bot connector, illustrating various example components to which the monitoring bot 125 is connected to provide responses to a user.

Within the monitored system, a pipeline 210 is illustrated. In various aspects, pipelines 210 provide defined pathways and handlers for various operations or jobs processed via a given system. For example, a network pipeline handles network connection requests into or out of the system, whereas a graphics rendering pipeline handles graphics and display operations for the system. Pipelines 210 may be modular and made of individual systems or services that are strictly defined in the inputs they accept and the outputs they generate, which improves the flexibility, reliability, and ease of upgrade for the system's operations. One such system or service, which may be considered part of the pipeline 210 or outside of the pipeline 210, is a job manager 220. The job manager 220 moves various jobs through the pipeline 210, and passes various events occurring in the pipeline to a mapper 230 and/or to a reducer 240 or is listened to by the mappers 230 and reducers 240 for jobs including a corresponding identifier.

Mappers 230 and reducers 240 report to a log storage 250 and/or to a telemetry storage 260 various events, parties requesting those events, and parties on which those events are performed. In various aspects, a mapper 230 corresponds to an event type, requestor, receiver, requestor/receiver pair, event/requestor pair, event/receiver pair, or event/requestor/receiver tuple and provides reports to the log storage 250 and/or to a telemetry storage 260 whenever the corresponding identifier is present in a job. A reducer 240 also corresponds to identifiers, but is operable to collect several jobs occurring over a period of time to provide an aggregated metric of those jobs to be reported to the log storage 250 and/or to a telemetry storage 260. Although only one mapper 230 and one reducer 240 are illustrated in FIG. 2, one of ordinary skill in the art will recognize that multiple mappers 230 and reducers 240 may be present in various aspects.

Log data stored in the log storage 250 provides a record of the actions taken within the monitored system that are collected and/or aggregated by the mappers 230 and reducers 240. Telemetry data stored in the telemetry storage 260 provides a record of the parties communicating remotely with the system (e.g., IP addresses, usernames, etc. of parties requesting or receiving commands; times, types, or sizes of inbound/outbound communications; calculations based on inbound/outbound communications). In various aspects, the log storage 250 and the telemetry storage 260 may be combined into a single database or other storage solution, or the data collected by the various mappers 230 and reducers 240 may be split into additional or different categories into more or fewer storage solutions that those illustrated in FIG. 2.

The components illustrated in FIG. 2 as part of the bot connector enable a user to access the data held in the log storage 250 and the telemetry storage 260 via the messaging application 115. As illustrated, the monitoring bot 125 is in communication with one or more of the storage solutions part of the monitored system (e.g., the log storage 250 and the telemetry storage 260). The monitoring bot 125 sends queries to the monitored system to be executed on one or more storage solutions, and is provided with a response to the query. In various aspects, the monitoring bot 125 uses one or more Application Program Interfaces (APIs) to communicate with the storage solutions and endpoints according to the formats that they use via a pluggable logic to enable the framework of bot monitoring.

In various aspects, the monitoring bot 125 may format the response for consumption by the user via one or more endpoints (or the response is formatted by the monitored system). For example, the monitoring bot 125 is operable to communicate the response to the cloud hosted messaging service 120 to transmission to the user via a format used by the messaging application 115 for display therein. In other examples, the monitoring bot is operable to receive a query from the messaging application 115 (via the cloud hosted messaging service 120) and return the response via a different format or endpoint. For example, the monitoring bot 125 transmits a response as an email message to an email server 270 or a different format for another messaging interface 280 (e.g., a second messaging application 115, an SMS or MMS message for a text messaging application).

In further aspects, the monitoring bot 125 is operable to interpret the response to detect whether a failure or error has occurred on the monitored system or between the monitored system and the user device, and to transmit a proactive measure to one or more endpoints to handle the failure or error without requiring user intervention. In one example, if a system process or flow is interrupted, the monitoring bot 125 is operable to transmit a proactive measure to the monitored system to retry the interrupted process or flow instead of or in addition to transmitting the message to a messaging application 115. In a second a second example, when the user device 110 and the monitored computing system/framework 130 lose connectivity (e.g., due to an access token expiring, a connection timeout), the monitoring bot 125 detects the connection failure and transmits a proactive measure to one or more of the user device 110 or the monitored computing system/framework 130 to reestablish the connection between the two systems.

Figure 3:
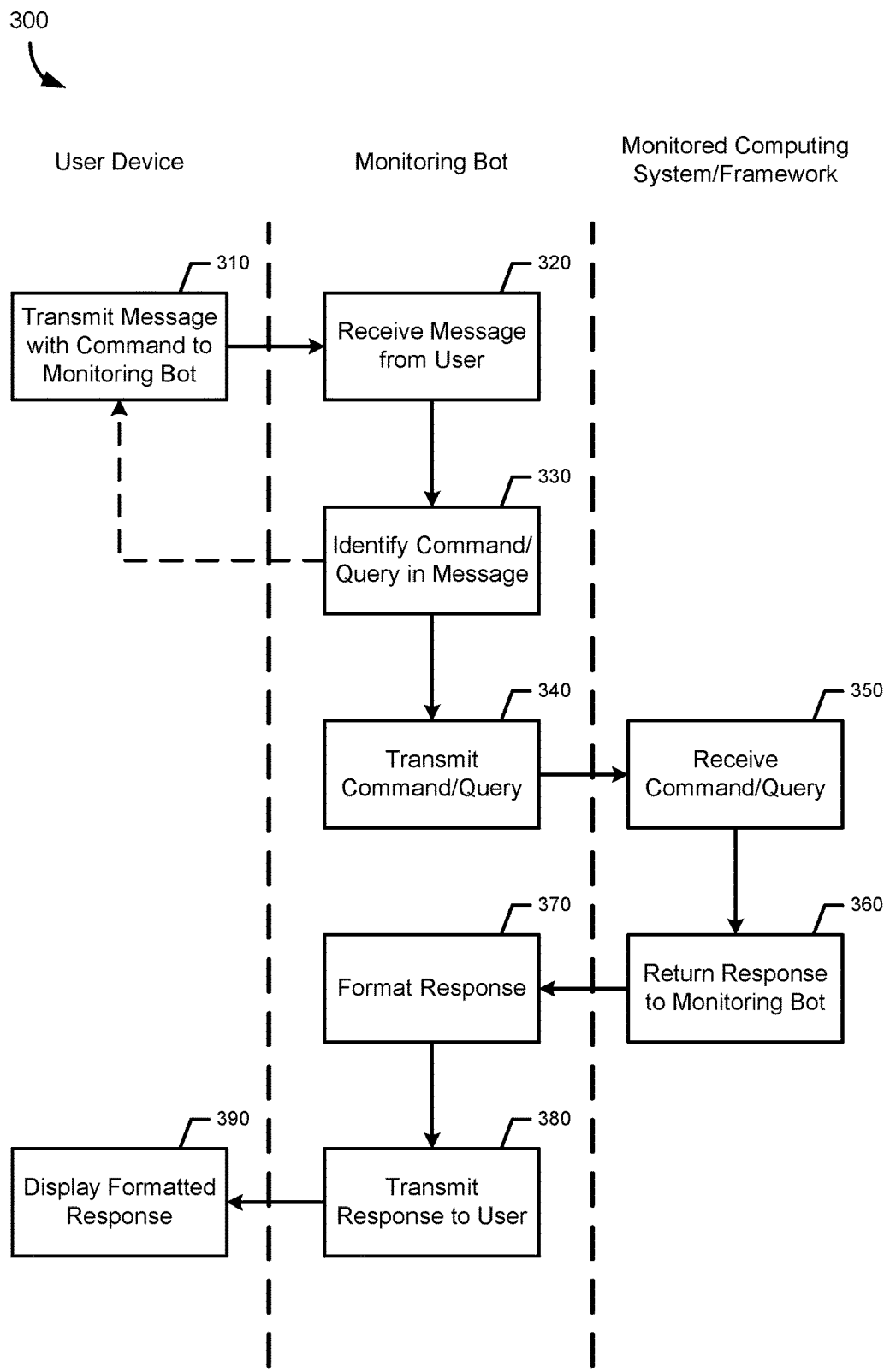
FIG. 3 is a flow chart showing general stages involved in an example method for providing bot monitoring of a network.

FIG. 3 is a flow chart showing general stages involved in an example method 300 for providing bot monitoring of a network or other system. Method 300 begins at OPERATION 310 in response to a user transmitting a message including a command or query addressed to a monitoring bot 125, and the message is received by the monitoring bot 125 in OPERATION 320. In various aspects, the message includes an access token associated with the user who sent the message to the monitoring bot 125 so that the monitoring bot 125 may access the monitored computing system/framework 130 with the same permissions as those afforded to the requesting user.

The monitoring bot 125 identifies the query in the message in OPERATION 330. In some aspects, where the message is transmitted as a natural language request, the monitoring bot 125 parses the message to identify keywords and word orders indicative of a command of the query and its objects. In other aspects, where the message is transmitted in a menu-driven request, the monitoring bot 125 identifies an identifier for a menu operand or a command and object linked to the menu operand in the message.

Method 300 optionally returns to OPERATION 310 in response to the monitoring bot 125 requiring more detail to interpret a query. For example, in a nested menu-driven request, the monitoring bot 125 may send a menu (or a sub-menu thereof) to the messaging application 115 in response to receiving the message to prompt the user to provide more details. In another example, in a natural language request, the monitoring bot 125 may request clarification as to a command or an object in a query (e.g., "I do not understand your request, could you phrase it another way?", "Do you want me to find out about X?", "which system of the network do you want to learn about recent errors on?"). In various aspects, the messages may switch from natural language messages to menu-driven messages or from menu-driven messages to natural language messages over the course of identifying the command or object in the message.

Method 300 proceeds to OPERATION 340 in response to the query being identified in the message at OPERATION 330. At OPERATION 340, the query is formatted into a format recognizable by the machine or service in the monitored computing system/framework 130 that the monitoring bot 125 is directed to communicate with by the message. For example, the result of a menu-driven or natural language message is formatted as a command line instruction. In various aspects, the monitoring bot 125 is directed to a particular machine or service on the monitored computing system/framework 130 as an object explicitly specified by the query. In other aspects, the monitoring bot 125 will determine a particular machine or service to communicate with based on a context of the message. For example, a message for a number of errors may contextually be directed to a default machine to query one or all of the machines in the network in aggregate, or may explicitly be directed to a given machine or group of machines to query.

The query is received in a recognizable format by the machine or service in the monitored computing system/framework 130 at OPERATION 350. The machine or service executes the query on the specified object, such as, for example, a log of telemetry data to produce a response. In various aspects, a query includes multiple objects or multiple fields of interest from a single object that are included in the response. For example, when querying a modular pipeline for collecting telemetry data, the pipeline is queryable at multiple points of the pipeline to produce a report indicative of how the pipeline is handling the flow of data therein.

At OPERATION 360 the response is returned from the monitored computing system/framework 130 to the monitoring bot 125. In some aspects, the report is returned in a format understandable by the messaging application 115, while in other aspects, the report is returned in a different format. In aspects where the report is returned in a different format than one interpretable by the messaging application 115, or the user has indicated that the report should be provided to a different target (e.g., a second messaging application 115, an email application, a local log file) the monitoring bot 125 formats the response according to the user's desired format at OPERATION 370.

Proceeding to OPERATION 380, the monitoring bot 125 transmits the response to the user device 110, and at OPERATION 390, the response is displayed to the user. In various aspects, the response is displayed to the user according to the user interface of the application designated at the target of the response. For example, when the user has specified that responses are to be received in the messaging application 115, the response will be formatted as a message from the monitoring bot 125 to be displayed in a message window user interface. In another example, when the user has specified that the response is to be received as an email message, the response will be formatted as an email from the monitoring bot 125 to be displayed in a preview window of an email application.

Figure 4A:
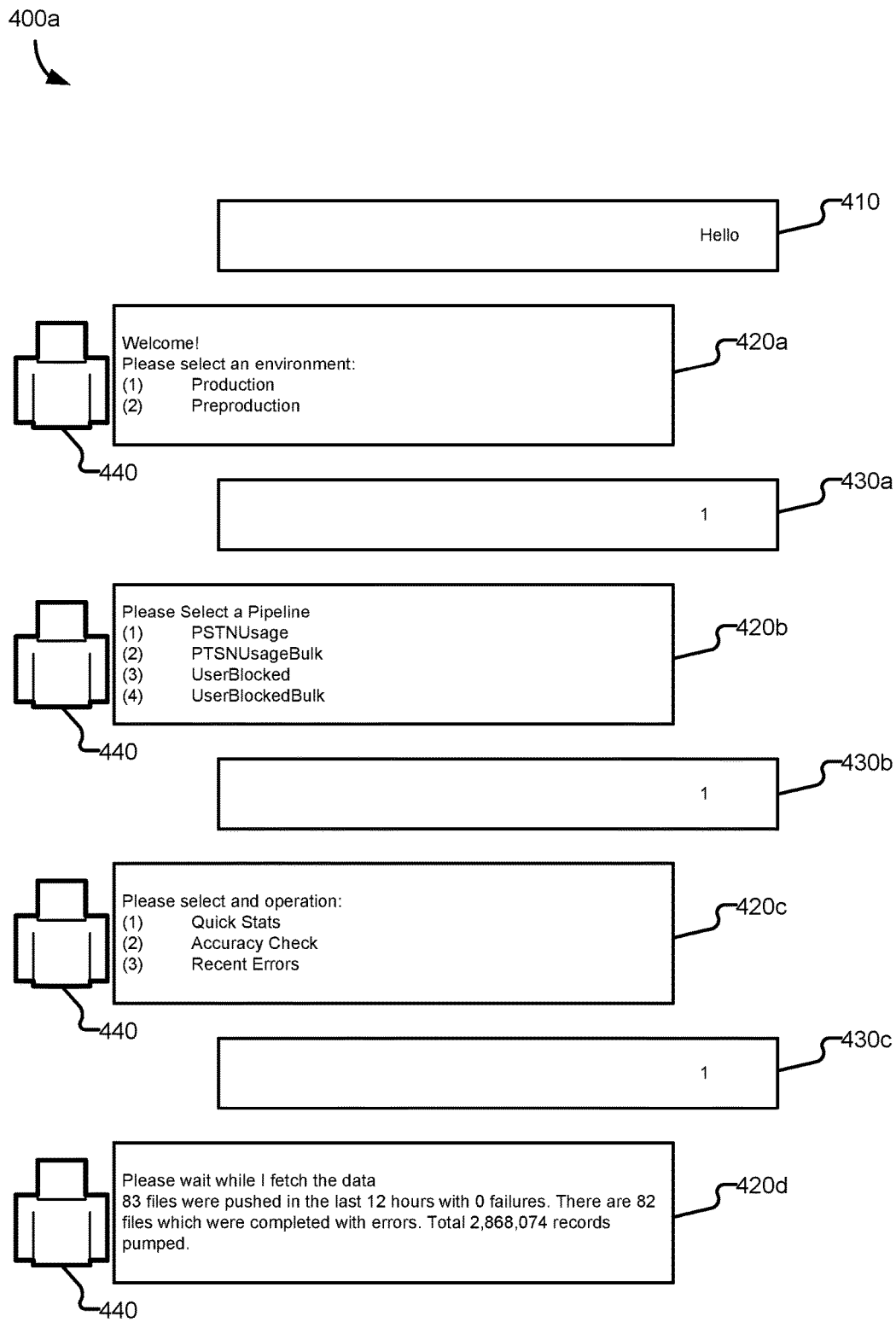
FIGS. 4A-4C illustrate example conversation histories.
Figure 4B:
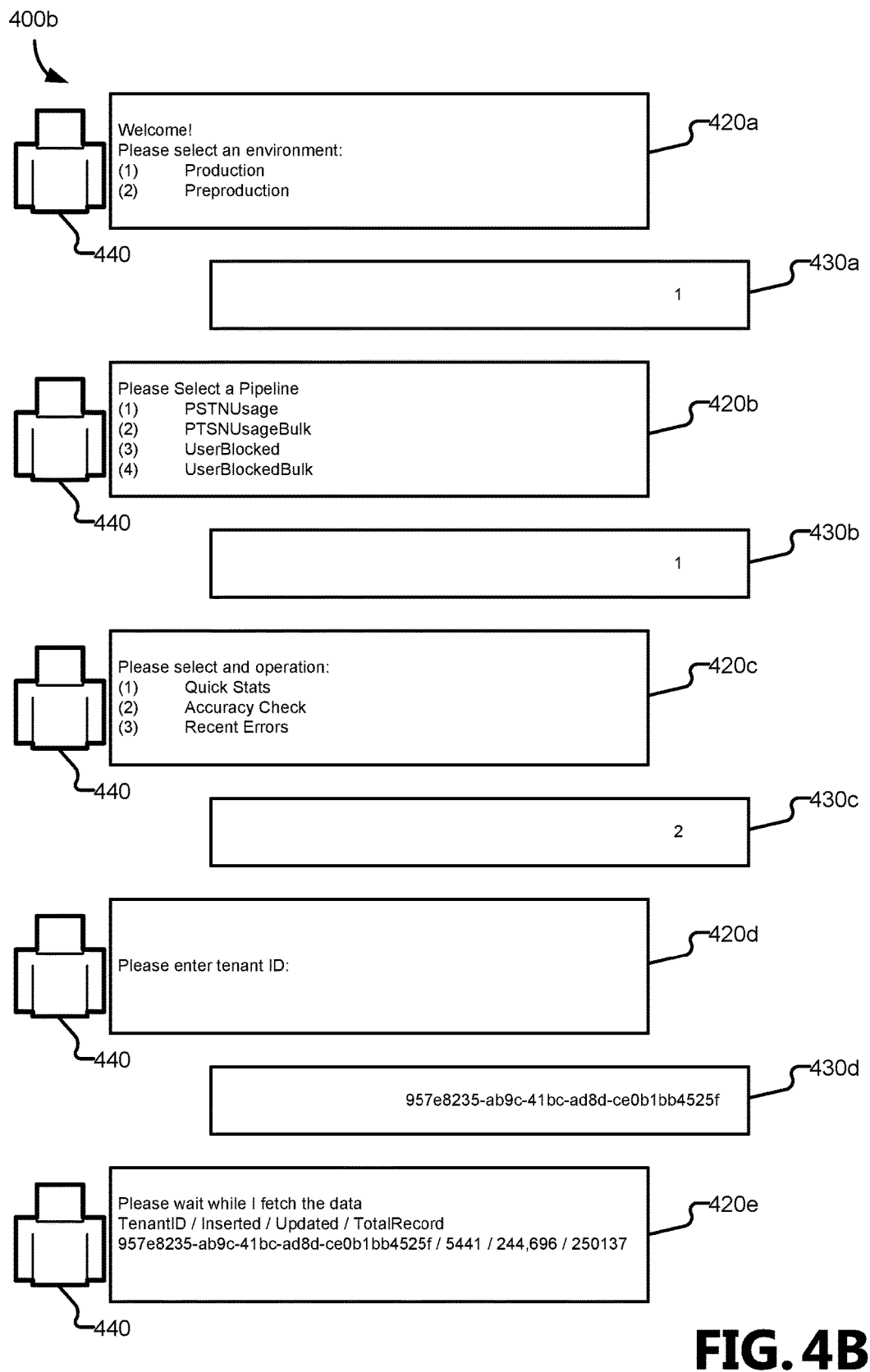
Figure 4C:
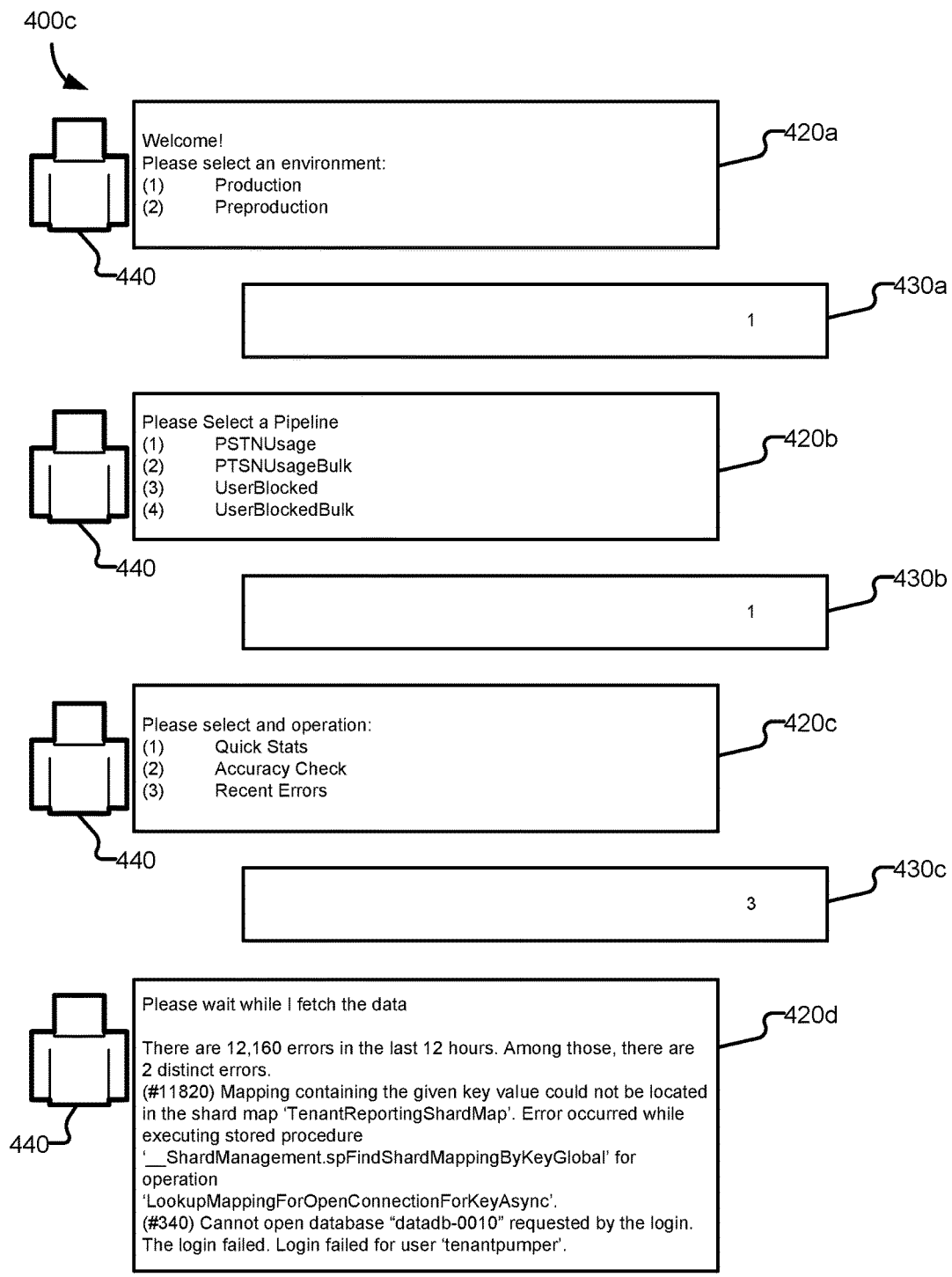

FIGS. 4A-C illustrate example conversation histories 400a-c (generally, history 400). Each history 400 illustrates a non-limiting example conversation between a user and a monitoring bot 125. Each conversation may optionally start with an opening message 410 transmitted from the user to the monitoring bot 125, or in response to the user selecting the monitoring bot 125 from a contacts list (e.g., by double clicking a contact name or icon associated with the monitoring bot 125) and the monitoring bot 125 responding with a first outbound message 420a (generally, outbound message 420). In various aspects, the outbound messages 420 may be clarifying messages to which the user will respond with an inbound message 430, or response messages that will provide data from the monitored computing system/framework 130 to the user.

Depending on the messaging application 115, the layout of the messages in a given history 400 may vary from that shown in FIGS. 4A-C. For example, messages from the monitoring bot 125 may be identified as from the monitoring bot via an avatar 440, a distinct color, a name, or a window devoted to messages to the monitoring bot 125. In another example, messages may be organized top-to-bottom or bottom-to-top via a chronological order. In a further example, a history 400 may include or exclude prior conversations between the user and the monitoring bot 125. In an additional aspect, the messages may be displayed with or without a timestamp that may be present in the message body or outside the message body.

As shown in FIG. 4A in a first history 400a, a user has initiated a conversation with the monitoring bot 125 via an opening message 410. The monitoring bot 125 responds with a first outbound message 420a detailing environments to which it can connect via a menu-driven interface. The user responds with a first inbound message 430a selecting a first option presented in the first outbound message 420a. The monitoring bot 125 and the user continue transmitting clarifying messages (outbound messages 420b and 420c) and responses thereto (associated inbound messages 430b and 430c) until the monitoring bot 125 has sufficient information to select a command and an object to perform that command on. In the illustrated example, the user has selected the "PTSNUsage" pipeline of the "Production" environment as the object to perform a "Quick Stats" command upon. In response to having a defined command and object, the monitoring bot 125 transmits the query to the appropriate system in the monitored computing system/framework 130 and returns the response of the selected query in the fourth outbound message 420d.

As illustrated, the "Quick Stats" command provides time-bounded statistics for operations that have occurred on the system identified as the object. In various aspects, the user may specify customized sets of statistics to be included in a "Quick Stats" command and vary the bounded time from which the statistics are to be calculated. In the illustrated response included in the fourth outbound message 420d, the "Quick Stats" command returns a number of files pushed through the pipeline without errors, a number of files pushed through the pipeline with errors, and a number of records having been pumped through the pipeline during the bounded time. As will be appreciated, the monitoring bot 125 is further operable to provide the response to a different user or via a different format in addition to or instead of the user and the messaging application 115 used to request the response.

As shown in FIG. 4B in a second history 400b, the monitoring bot 125 has initiated the conversation with a first outbound message 420a. In various aspects, the first outbound message 420a is transmitted in response the user opening a dialog control of the messaging application 115 with the monitoring bot 125 as the selected contact. The user responds with a first inbound message 430a selecting a first option presented in the first outbound message 420a. The monitoring bot 125 and the user continue transmitting clarifying messages (outbound messages 420b, 420c, and 420d) and responses thereto (associated inbound messages 430b, 430c, and 430d) until the monitoring bot 125 has sufficient information to select a command and an object to perform that command on. In the illustrated example, the user has selected the "Accuracy Check" command to perform on tenant "957e8235-ab9c-41bc-ad8d-ce0b1bb4525f" of the "PTSNUsage" pipeline of the "Production" environment. In response to having a defined command and object, the monitoring bot 125 transmits the query to the appropriate system in the monitored computing system/framework 130 and returns the response of the selected query in the fifth outbound message 420e.

As illustrated, the "Accuracy Check" command provides counts of the operations initiated by a given tenant in the monitored computing system/framework 130. In the illustrated response included in the fifth outbound message 420e, the "Accuracy Check" command returns the identifier of a tenant, a number of inserted operations, a number of updated operations, and a total number of operations. As will be appreciated, the monitoring bot 125 is further operable to provide the response to a different user or via a different format in addition to or instead of the user and the messaging application 115 used to request the response.

As shown in FIG. 4C in a third history 400c, the monitoring bot 125 has initiated the conversation with a first outbound message 420a. The user responds with a first inbound message 430a selecting a first option presented in the first outbound message 420a. The monitoring bot 125 and the user continue transmitting clarifying messages (outbound messages 420b and 420c) and responses thereto (associated inbound messages 430b and 430c) until the monitoring bot 125 has sufficient information to select a command and an object to perform that command on. In the illustrated example, the user has selected the "Recent Errors" command to perform on the "PTSNUsage" pipeline of the "Production" environment. In response to having a defined command and object, the monitoring bot 125 transmits the query to the appropriate system in the monitored computing system/framework 130 and returns the response of the selected query in the fourth outbound message 420d.

As illustrated, the "Recent Errors" command provides a time-bounded count of the errors that have occurred on the system identified as the object. In various aspects, the user may specify different time-bounds and whether certain errors or alerts are to be ignored or highlighted in a response. In the illustrated response included in the fourth outbound message 420d, the "Recent Errors" command further provides the identities of two error types and additional details of those errors to the user within the messaging application. As will be appreciated, the monitoring bot 125 is further operable to provide the response to a different user or via a different format in addition to or instead of the user and the messaging application 115 used to request the response.

As will be appreciated, the dialogs in the messages illustrated in FIGS. 4A-C are presented as non-limiting examples, as are the commands and their objects. One of ordinary skill in the art will appreciate that more or fewer options, in different arrangements and orders may be presented in menu-driven dialogs, and natural language dialogs may be used in substitution or addition to the menu-driven dialogs presented.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
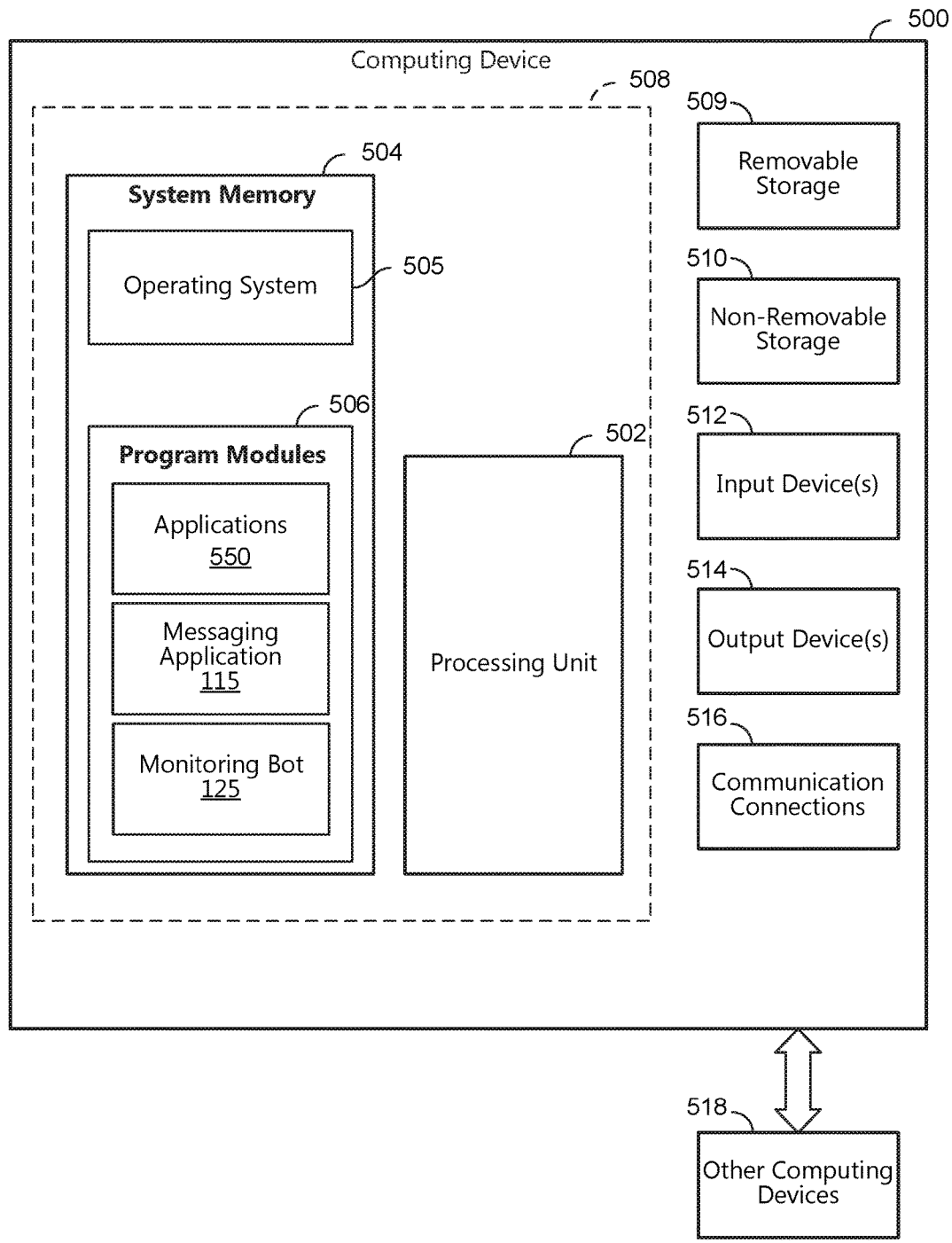
FIG. 5 is a block diagram illustrating example physical components of a computing device.
Figure 6A:
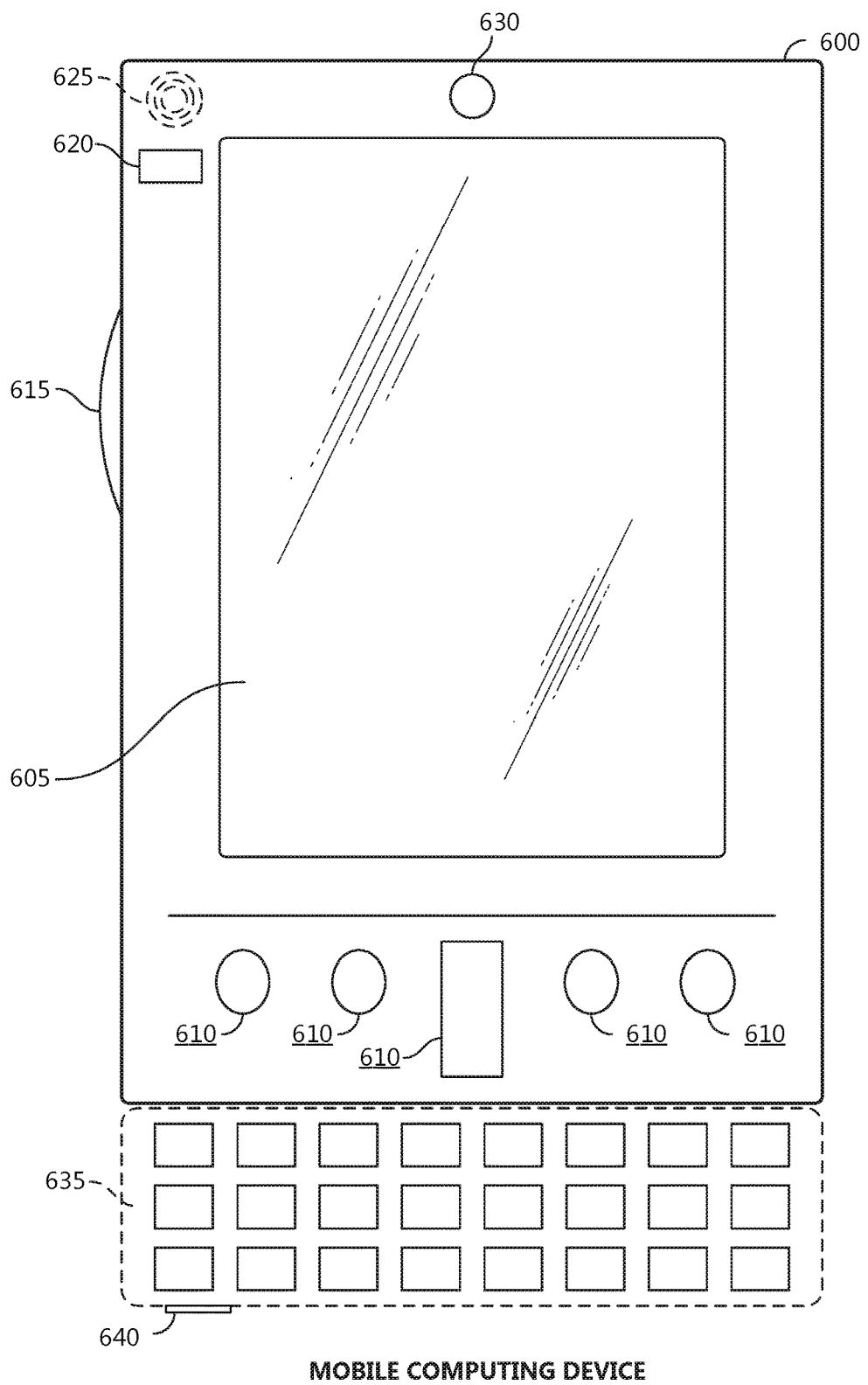
FIGS. 6A and 6B are block diagrams of a mobile computing device.
Figure 6B:
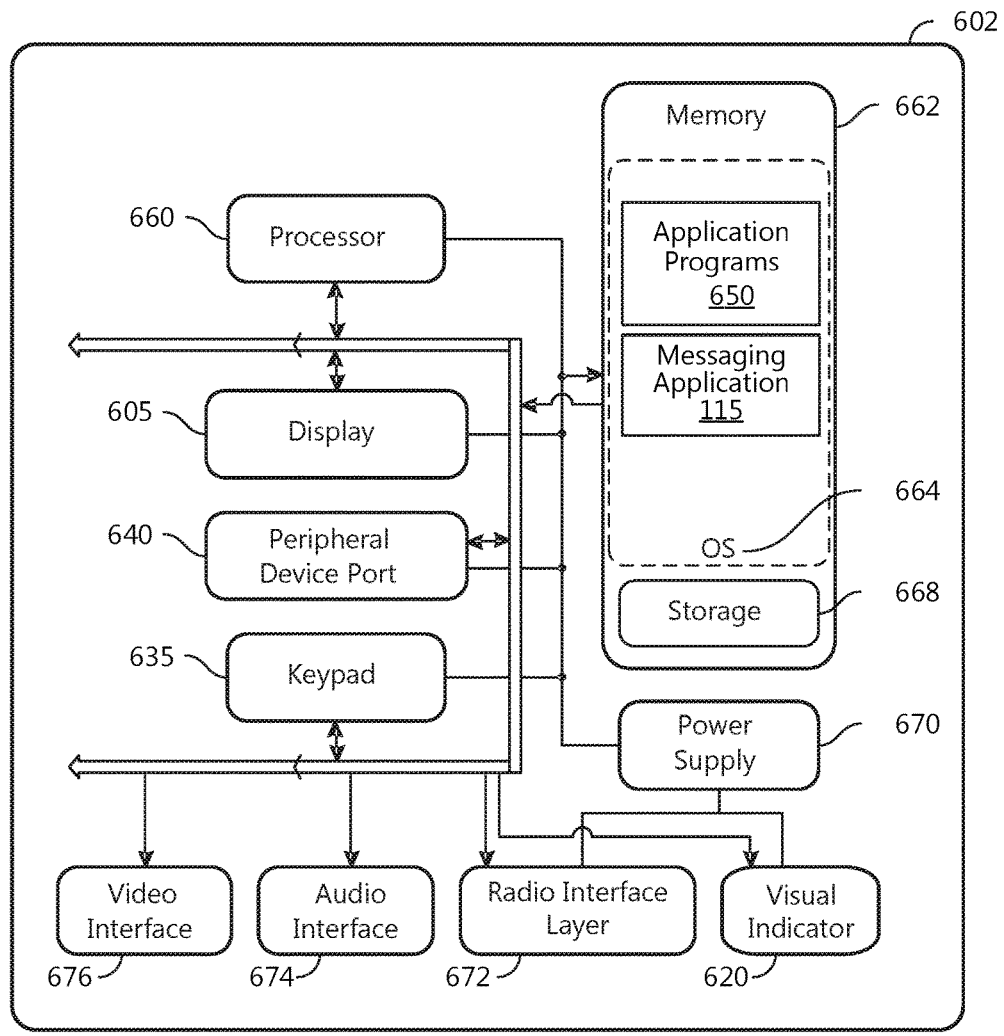
Figure 7:
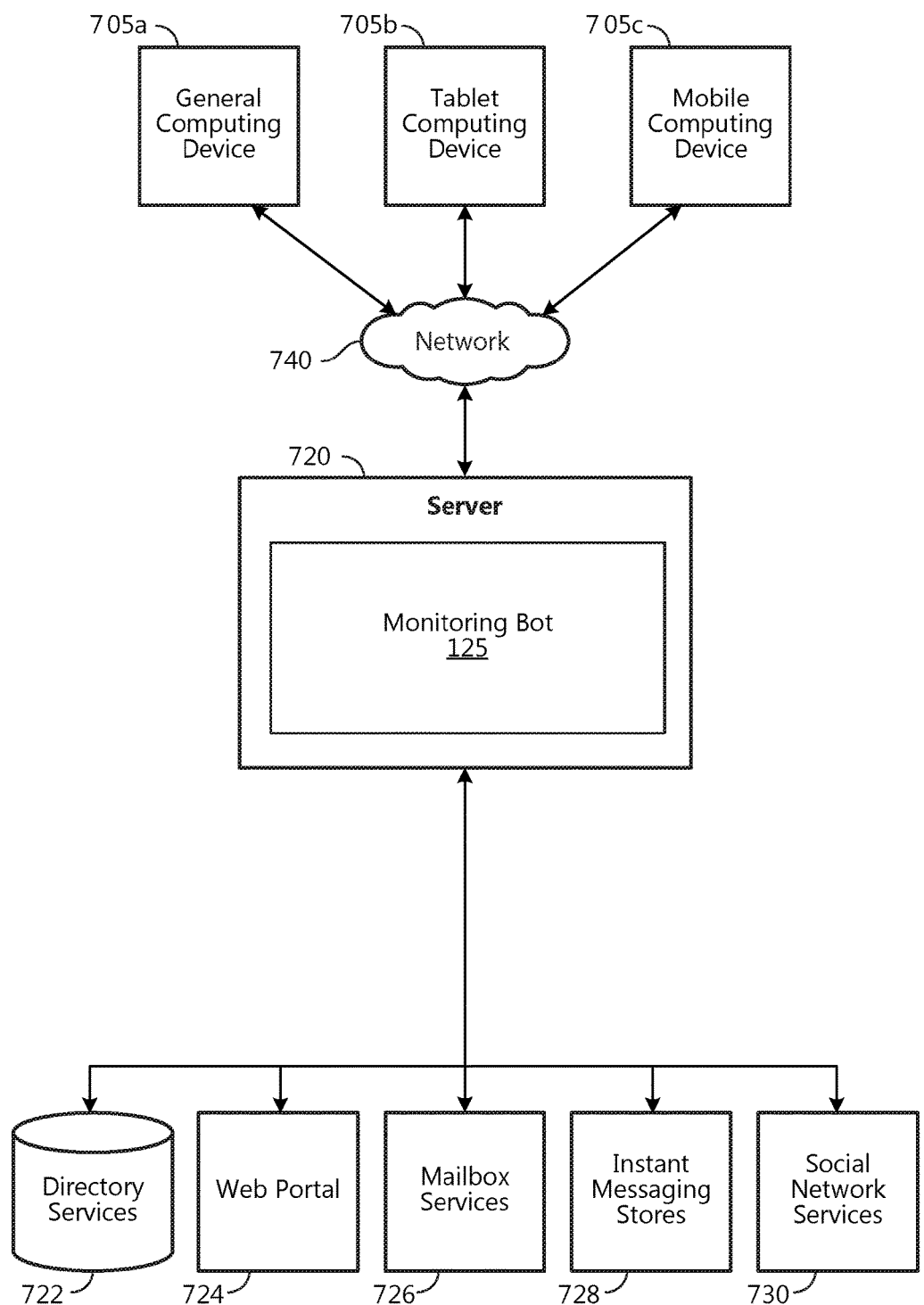
FIG. 7 is a block diagram of a distributed computing system.

FIGS. 5-7 and the associated descriptions provide a discussion of a variety of operating environments in which examples are practiced. However, the devices and systems illustrated and discussed with respect to FIGS. 5-7 are for purposes of example and illustration and are not limiting of a vast number of computing device configurations that are utilized for practicing aspects, described herein.

FIG. 5 is a block diagram illustrating physical components (i.e., hardware) of a computing device 500 with which examples of the present disclosure may be practiced. In a basic configuration, the computing device 500 includes at least one processing unit 502 and a system memory 504. According to an aspect, depending on the configuration and type of computing device, the system memory 504 comprises, but is not limited to, volatile storage (e.g., random access memory), non-volatile storage (e.g., read-only memory), flash memory, or any combination of such memories. According to an aspect, the system memory 504 includes an operating system 505 and one or more program modules 506 suitable for running software applications 550. According to an aspect, the system memory 504 includes messaging application 115 and/or monitoring bot 125. The operating system 505, for example, is suitable for controlling the operation of the computing device 500. Furthermore, aspects are practiced in conjunction with a graphics library, other operating systems, or any other application program, and are not limited to any particular application or system. This basic configuration is illustrated in FIG. 5 by those components within a dashed line 508. According to an aspect, the computing device 500 has additional features or functionality. For example, according to an aspect, the computing device 500 includes additional data storage devices (removable and/or non-removable) such as, for example, magnetic disks, optical disks, or tape. Such additional storage is illustrated in FIG. 5 by a removable storage device 509 and a non-removable storage device 510.

As stated above, according to an aspect, a number of program modules and data files are stored in the system memory 504. While executing on the processing unit 502, the program modules 506 (e.g., messaging applications 115, monitoring bot 125) perform processes including, but not limited to, one or more of the stages of the method 300 illustrated in FIG. 3. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, the computing device 500 has one or more input device(s) 512 such as a keyboard, a mouse, a pen, a sound input device, a touch input device, etc. The output device(s) 514 such as a display, speakers, a printer, etc. are also included according to an aspect. The aforementioned devices are examples and others may be used. According to an aspect, the computing device 500 includes one or more communication connections 516 allowing communications with other computing devices 518. Examples of suitable communication connections 516 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. According to an aspect, any such computer storage media is part of the computing device 500. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which aspects may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. According to an aspect, the display 605 of the mobile computing device 600 functions as an input device (e.g., a touch screen display). If included, an optional side input element 615 allows further user input. According to an aspect, the side input element 615 is a rotary switch, a button, or any other type of manual input element. In alternative examples, mobile computing device 600 incorporates more or fewer input elements. For example, the display 605 may not be a touch screen in some examples. In alternative examples, the mobile computing device 600 is a portable phone system, such as a cellular phone. According to an aspect, the mobile computing device 600 includes an optional keypad 635. According to an aspect, the optional keypad 635 is a physical keypad. According to another aspect, the optional keypad 635 is a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 600 incorporates peripheral device port 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 incorporates a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

According to an aspect, one or more application programs 650 are loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. According to an aspect, messaging application 115 is loaded into memory 662. The system 602 also includes a non-volatile storage area 668 within the memory 662. The non-volatile storage area 668 is used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

According to an aspect, the system 602 has a power supply 670, which is implemented as one or more batteries. According to an aspect, the power supply 670 further includes an external power source, such as an AC adapter or a powered docking cradle that supplements or recharges the batteries.

According to an aspect, the system 602 includes a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

According to an aspect, the visual indicator 620 is used to provide visual notifications and/or an audio interface 674 is used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. According to an aspect, the system 602 further includes a video interface 676 that enables an operation of an on-board camera 630 to record still images, video stream, and the like.

According to an aspect, a mobile computing device 600 implementing the system 602 has additional features or functionality. For example, the mobile computing device 600 includes additional data storage devices (removable and/or non-removable) such as, magnetic disks, optical disks, or tape. Such additional storage is illustrated in FIG. 6B by the non-volatile storage area 668.

According to an aspect, data/information generated or captured by the mobile computing device 600 and stored via the system 602 are stored locally on the mobile computing device 600, as described above. According to another aspect, the data are stored on any number of storage media that are accessible by the device via the radio 672 or via a wired connection between the mobile computing device 600 and a separate computing device associated with the mobile computing device 600, for example, a server computer in a distributed computing network, such as the Internet. As should be appreciated such data/information are accessible via the mobile computing device 600 via the radio 672 or via a distributed computing network. Similarly, according to an aspect, such data/information are readily transferred between computing devices for storage and use according to well-known data/information transfer and storage means, including electronic mail and collaborative data/information sharing systems.

FIG. 7 illustrates one example of the architecture of a system for bot monitoring of a network as described above. Content developed, interacted with, or edited in association with the monitoring bot 125 is enabled to be stored in different communication channels or other storage types. For example, various documents may be stored using a directory service 722, a web portal 724, a mailbox service 726, an instant messaging store 728, or a social networking site 730. The monitoring bot 125 is operative to use any of these types of systems or the like for bot monitoring of a network, as described herein. According to an aspect, a server 720 provides the monitoring bot 125 to clients 705*a,b,c*. As one example, the server 720 is a web server providing the monitoring bot 125 over the web. The server 720 provides the monitoring bot 125 over the web to clients 705 through a network 740. By way of example, the client computing device is implemented and embodied in a personal computer 705*a*, a tablet computing device 705*b* or a mobile computing device 705*c* (e.g., a smart phone), or other computing device.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

I claim:

1. A method for monitoring a computing system/framework via a bot integrated with a messaging application, comprising:
   receiving, by a monitoring bot, a message from a user device via a messaging application;
   identifying a query included in the message;
   transmitting, by the monitoring bot, the query to a monitored computing system/framework, wherein each of the user device, the monitoring bot, and the monitored computing system/framework is remote from each other;
   receiving a response to the query from the monitored computing system/framework;
   determining via the response whether a failure has occurred on the monitored computing system/framework;
   in response to determining that the failure has occurred on the monitored computing system/framework, transmitting without user intervention a proactive measure to address the failure:
   formatting the response; and
   transmitting the formatted response to the user device.

2. The method of claim 1, wherein the user device and the monitored computing system/framework share a network environment.

3. The method of claim 1, wherein the user device and the bot share a network environment.

4. The method of claim 1, wherein identifying the query includes identifying a command and an object of the query.

5. The method of claim 4, wherein the monitored computing system/framework includes a traffic pipeline, and the traffic pipeline is the object of the query.

6. The method of claim 4, wherein the query includes more than one object.

7. The method of claim 1, wherein the bot is integrated with the messaging application such that the bot is provided with access permissions to the monitored computing system/framework of a user from whom the message was received.

8. The method of claim 1, wherein the message is a menu-driven message.

9. A system for monitoring a computing system/framework via a bot integrated with a messaging application, comprising:
   a processor; and
   a memory storage device, including instructions that when executed by the processor provide a monitoring bot in communication with a messaging application running on a user device in a first network environment and a monitored system/framework in a second network environment, the monitoring bot operable to:
   receive, at the monitoring bot, a message from the messaging application;
   identify a query in the message, the query including a command and an object in the monitored computing system/framework on which the command is to be performed;
   transmit the query to the object in the monitored system/framework, wherein each of the user device, the monitoring bot, and the monitored computing system/framework is remote from each other;
   in response to transmitting the query, receive a response to the command;
   determine via the response whether a failure has occurred on the monitored computing system/framework;
   in response to determining that the failure has occurred on the monitored computing system/framework, transmit without user intervention a proactive measure to address the failure; and
   transmit the response to the messaging application.

10. The system of claim 9, wherein to identify the query in the message, the monitoring bot is further operable to parse the message based on grammatical structure and content to determine the command and the object.

11. The system of claim 9, wherein to identify the query in the message, the monitoring bot is further operable to transmit to the user device a menu interface outlining operands associated with commands and objects.

12. The system of claim 9, wherein to identify the query in the message, the monitoring bot is further operable to transmit a clarifying message to the user device via the messaging application to request additional details to identify the query.

13. The system of claim 9, wherein the monitoring bot receives an access token associated with a user from whom the message was received, wherein the access token enables the monitoring bot to access the monitored computing system/framework with permissions afforded to the user.

14. The system of claim 9, wherein the response is transmitted to another user than a user from whom the message was received.

15. A computer readable storage device including instructions executable by a processor for monitoring a computing system/framework via a bot integrated with a messaging application, comprising:
   receiving, at a monitoring bot and from a user device of a first network environment, a message via a messaging application;
   identifying a query included in the message;
   transmitting the query to a monitored computing system/framework of a second network environment, wherein each of the first network environment, the second network environment, and the monitoring bot is remote from each other;
   receiving a response to the query from the monitored computing system/framework;
   determining via the response whether a failure has occurred on the monitored computing system/framework;
   in response to determining that the failure has occurred on the monitored computing system/framework, transmitting without user intervention a proactive measure to address the failure; and
   transmitting the response to the user device.

16. The computer readable storage device of claim 15, wherein prior to transmitting the response to the user device, the bot formats the response as a message for receipt by the messaging application.

17. The computer readable storage device of claim 15, wherein the bot is provided on a cloud hosted messaging service of a third network environment.

18. The computer readable storage device of claim 15, wherein the bot is identified as a contact in the messaging application on the user device.

* * * * *